(12) United States Patent
Kobayashi

(10) Patent No.: US 6,328,835 B1
(45) Date of Patent: Dec. 11, 2001

(54) STRUCTURE AND METHOD FOR AUTOMATIC SUPPLY OF BEAD-WITH-FILLER

(75) Inventor: Satoshi Kobayashi, Kodaira (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/387,902

(22) Filed: Sep. 1, 1999

(30) Foreign Application Priority Data

Sep. 1, 1998 (JP) .................................................. 10-247630

(51) Int. Cl.[7] .................................................. B29D 30/48
(52) U.S. Cl. .......................... 156/111; 156/131; 156/136; 156/396; 156/403; 156/406.2; 156/422
(58) Field of Search .................................. 156/131, 136, 156/130.7, 111, 396, 403, 422, 406.2

(56) References Cited

U.S. PATENT DOCUMENTS

| | | | |
|---|---|---|---|
| 4,354,892 | * 10/1982 | Tarantola et al. | 156/136 |
| 4,581,084 | * 4/1986 | Mukae et al. | 156/136 |
| 5,203,938 | * 4/1993 | Moody et al. | 156/136 |
| 5,632,836 | * 5/1997 | Verschoor et al. | 156/111 |

* cited by examiner

Primary Examiner—Geoffrey L. Knable
(74) Attorney, Agent, or Firm—Sughrue Mion, PLLC

(57) ABSTRACT

A structure and a method for supplying a bead-with-filler automatically to a tire molding machine are provided. The structure comprises a bead-with-filler preset apparatus for presetting a filler to an annular bead; a bead supply apparatus positioned at an upper stream side of the bead-with-filler preset apparatus for supplying the annular bead to the bead-with-filler preset apparatus; a bead-with-filler supplying apparatus positioned at a down stream side of the bead-with-filler preset apparatus for supplying the bead-with-filler to a tire molding machine; and a transfer apparatus for transferring the bead and the bead-with-filler having a catching section. The transfer apparatus turns for positioning the catching section at each delivery position of the bead supply apparatus, the bead-with-filler preset apparatus and the bead-with-filler supply apparatus.

14 Claims, 9 Drawing Sheets

STRUCTURE AND METHOD FOR AUTOMATIC SUPPLY OF BEAD-WITH-FILLER

BACKGROUND OF THE INVENTION

The present invention relates to a structure and a method for supplying a bead-with-filler which is a tire component to a tire molding machine.

In a tire molding process, two beads are supplied to form both side rims respectively, and hitherto supply of the beads to a tire molding machine has been carried out by workmen manually.

Also in case of supplying beads-with-filler, all works such as setting beads on a preset apparatus for attaching fillers to the beads, taking, out beads-with-filler from the preset apparatus and supplying them to the tire molding, machine have been carried out manually.

Such supply work of the bead-with-filler has been an obstacle to automation of the tire molding equipment.

The present invention has been accomplished in view of the foregoing and an object of the invention is to provide a structure and a method capable of supplying automatically beads-with-filler.

SUMMARY OF THE INVENTION

In order to attain the above object, the present invention provides a structure for automatic supply of a bead-with-filler, comprising a bead-with-filler preset apparatus for presetting a filler to an annular bead; a bead supply apparatus positioned at an upper stream side of the bead-with-filler preset apparatus for supplying the annular bead to the bead-with-filler preset apparatus; a bead-with-filler supply apparatus positioned at a down stream side of the bead-with-filler preset apparatus for supplying the bead-with-filler to a tire molding machine; and a transfer apparatus for transferring the bead and the bead-with-filler having a catching section, the transfer apparatus turning for positioning the catching section at each delivery position of the bead supply machine, the bead-with-filler preset apparatus and the bead-with-filler supply apparatus.

A bead supplied by the bead supply apparatus is received by the catching section of the transfer apparatus, then the transfer apparatus turns to deliver the bead to the bead-with-filler preset apparatus in which a filler is attached to the bead to form a bead-with-filler. The bead-with-filler is received by the catching section of the transfer apparatus, then the transfer apparatus again turns to deliver the bead-with-filler to the bead-with-filler supply apparatus which supplies the bead-with-filler to the tire molding machine. The above works are all carried out automatically.

The automatic supply structure may have a pair of the transfer apparatuses, one of the transfer apparatuses moving following movement of another apparatus with a lag.

Transfers of the bead and the bead-with-filler can be carried out partly simultaneously to improve working efficiency.

Otherwise, in the above-mentioned automatic supply structure, the transfer apparatus may have an upper stream side catching section and a down stream side catching section which are disposed at an angle and turn in a body about a common center, the upper stream side catching section turns between the bead supply apparatus and the bead-with-filler preset apparatus for transferring the bead, and the down stream side catching section turns between the bead-with-filter preset apparatus and the bead-with-filler supply apparatus for transferring the bead-with-filler.

Transfer of the bead from the bead supply apparatus to the bead-with-filler preset apparatus and transfer of the bead-with-filler from the bead-with-filler preset apparatus to the bead-with-filler supply apparatus can be carried out simultaneously to improve working efficiency.

In addition, the structure can be made simple and compact by using a common turn driving construction.

In the automatic supply structure, the catching section of the transfer apparatus may have at least three retaining pieces arranged on a common circle capable of expanding and contracting so that the retaining pieces can catch at inner side of the annular bead when the circle expands.

The catching section of the transfer apparatus expands radially outward to catch the annular bead or the annular bead-with-filler which is easily deformed elastically by an external force, so that the bead and the bead-with-filler can be easily caught and miniaturization of the transfer apparatus can be attempted.

Further, in the automatic supply structure, the bead supply apparatus may separate one or two beads from a bundle of the annular beads piled up to supply the bead-with-filler preset apparatus with the beads.

Since one or two pieces of bead are separated from the bundle of beads which can be transported easily, improvement of working efficiency can be attempted.

According to another aspect of the present invention, a method for automatic supply of a bead-with-filler is provided. This method comprises steps of, receiving a bead supplied from a bead supply apparatus by a catching section of a transfer apparatus; turning the catching section for delivering the bead to a bead-with-filler preset apparatus; attaching a filler to the bead in the bead-with-filler preset apparatus for presetting a bead-with-filler; receiving the bead-with-filler by the catching section of the transfer apparatus; turning the catching section for delivering the bead-with-filler to a bead-with-filler supply apparatus; and supplying the bead-with-filler to a tire molding machine by the bead-with-filler supply apparatus.

According to the method, the above-mentioned all steps can be carried out automatically so that labor can be reduced.

In the above automatic supply method, the transfer apparatus may have an upper stream side catching section and a down stream side catching section which are disposed at an angle and turn in a body about a common turning center, and when the upper stream side catching section turns to transfer the bead from the bead supply apparatus to the bead-with-filler preset apparatus, the down stream side catching section may turn to transfer the bead-with-filler from the bead-with-filler preset apparatus to the bead-with-filler supply apparatus.

Since the upper stream side catching section and the down stream side catching section are turned in a body, the bead and the bead-with-filler can be transferred simultaneously and working efficiency can be improved.

Further in the above automatic supply method, the bead supply apparatus may separate two pieces of bead from a bundle of the annular beads piled up to supply them, and the bead-with-filler preset apparatus may attach fillers to the respective two pieces of bead piled up simultaneously.

Since two pieces of bead piled up are attached respective fillers simultaneously, work for attaching the filler to the bead can be carried out efficiently.

In the above automatic supply method, still more, the bead-with-filler supply apparatus may have holding sections at both ends and a temporary holding section separated from the holding sections, and the two pieces of bead piled up on the transfer apparatus may be delivered to the bead-with-filler supply apparatus by steps of, holding one bead-with-filler on one of the holding sections of the bead-with-filler supply apparatus while another bead-with-filler is caught by the catching section of the transfer apparatus; separating the one bead-with-filler from the another bead-with-filler and delivering the one bead-with-filler onto the one holding section of the bead-with-filler supply apparatus; moving the another bead-with-filler left on the catching section of the transfer apparatus onto the temporary holding section of the bead-with-filler supply apparatus; and delivering the another bead-with-filler held on the temporary holding section onto another holding section of the bead-with-filler supply apparatus.

One of the two beads-with-filler piled up is separated and delivered to one of the holding sections of the bead-with-filler supply apparatus and another bead-with-filler is held on the temporary holding section then delivered to another holding section to deliver the beads-with-filler to the holding section on both ends of the bead-with-filler supply apparatus respectively, thus supply of the beads-with-filler to the tire molding machine can be facilitated.

BRIEF DESCRIPTION OF THE DRAWINGS

FIG. 7-1 to FIG. 7-12 are illustrations for showing an operation procedure in the structure for automatic supply of a bead-with-filler.

DETAILED DESCRIPTION OF PREFERRED EMBODIMENT OF THE INVENTION

Figure 1:
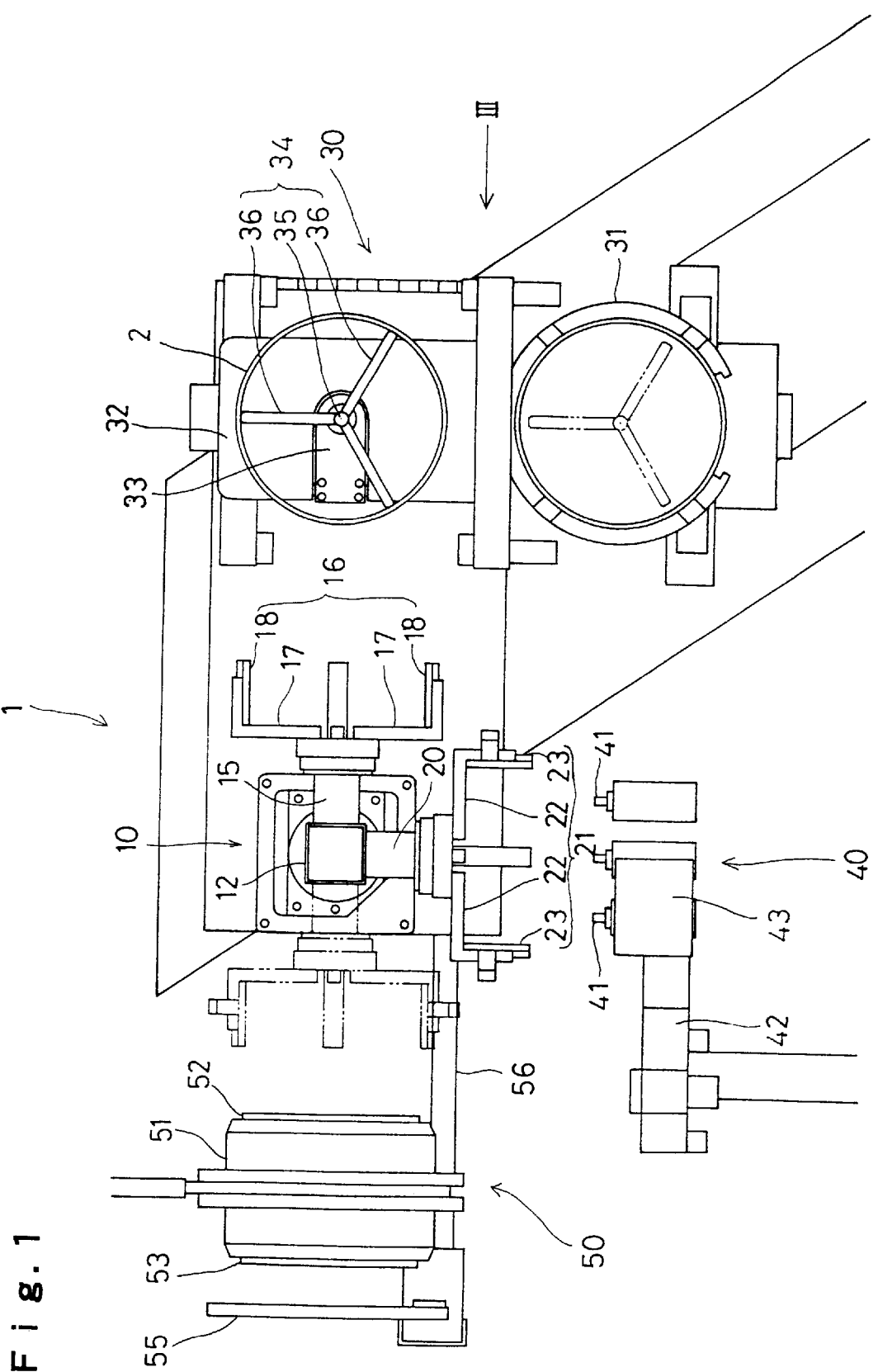
FIG. 1 is an entire plan view of a structure for automatic supply of a bead-with-filler according to a preferred embodiment of the present invention.
Figure 2:
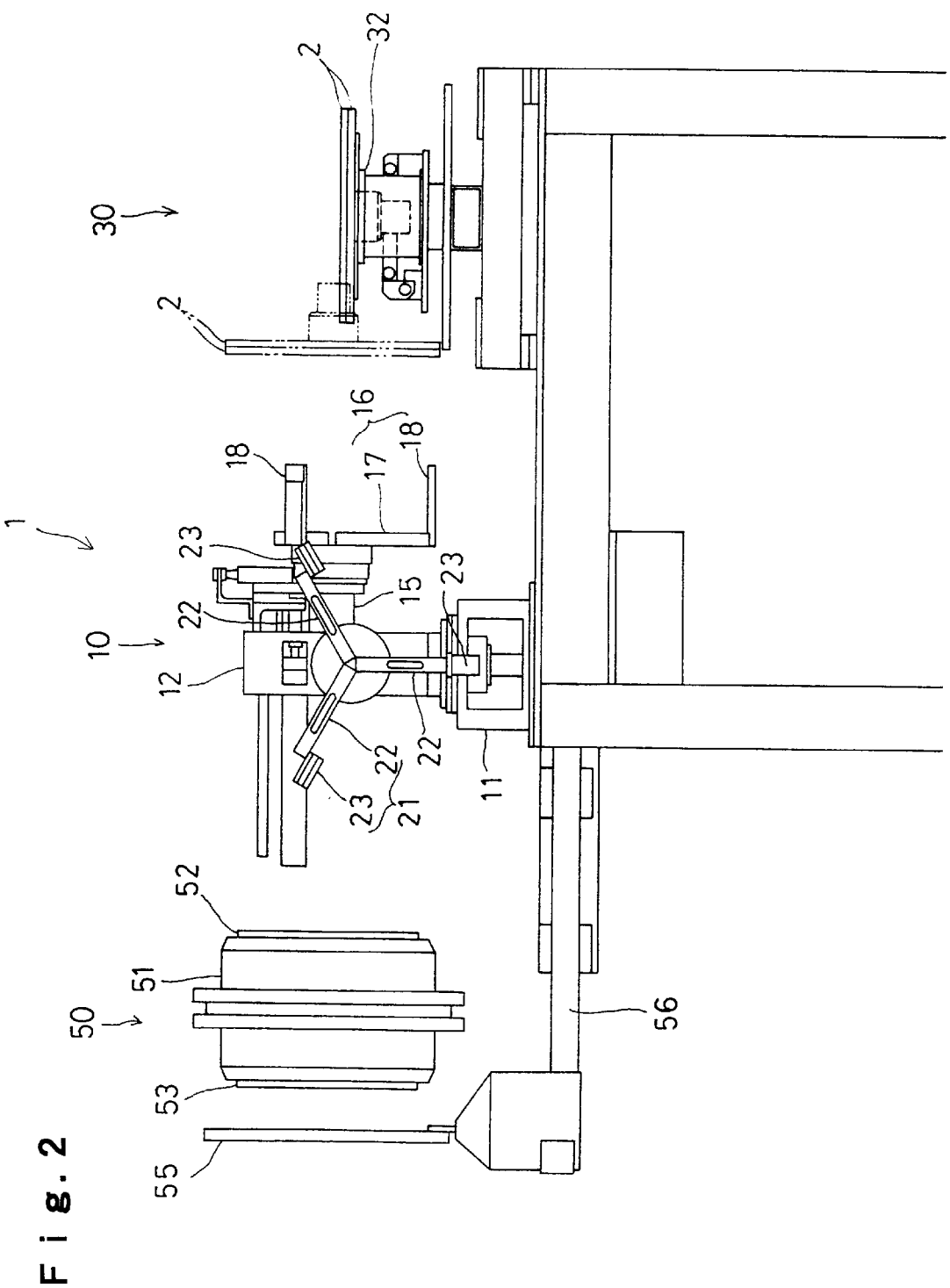
FIG. 2 is a partly omitted side view thereof.

Hereinafter, a preferred embodiment of the present invention will be described with reference to FIGS. 1 to 7. FIG. 1 is an entire plan view of a structure 1 for automatic supply of a bead-with-filler according to the embodiment, and FIG. 2 is a side view thereof.

As shown in FIG. 1, the structure I comprises a transfer apparatus 10 positioned at the center, a bead supply apparatus 30 disposed on the right side of the transfer apparatus 10, a bead-with-filler preset apparatus 40 disposed at an interval of 90 degrees clockwise from the bead supply apparatus 30 about the transfer apparatus 10, and a bead-with-filler supply apparatus 50 disposed at an interval of 90 degrees further clockwise from the bead-with-filler preset apparatus 40 about the transfer apparatus 10, namely at the left side of the apparatus 10.

Regarding the transfer apparatus 10, a rectangular tubular pillar 12 is erected on a base stand 11 so as to rotate about a vertical axis by nearly 90 degrees. Expansible arms 15, 20 are projected horizontally from neighboring respective side faces of the pillar 12 and at tip ends of the arms 15, 20 are provided an upper stream side catching section 16 and a down stream side catching section 21, respectively.

The upper stream side catching section 16 comprises three expansible rods 17 extending from the arm 15 radially at regular intervals and retaining pieces 18 provided at tip ends of the rods 17 respectively. Similarly, the down stream side catching section 21 comprises three expansible rods 22 extending from the arm 20 radially at regular intervals and retaining pieces 23 provided at tip ends of the rods 22 respectively.

The retaining pieces 18, 23 at the tip ends of the rods 17, 22 are positioned on the same circles respectively, and when the rods 17, 22 expand or contract, radii of the circles expand or contract.

The retaining pieces 18 of the upper stream side catching section 16 can support annular beads 2 from inner side at three points when the pieces 18 expand, and the retaining pieces 23 of the down stream side catching section 21 can support annular beads-with-filler 3 from inner side at three points when the pieces 23 expand.

The upper stream side catching section 16 and the down stream side catching section 21 are provided at tip ends of the expansible arms 15, 20 which are disposed at an angle of 90 degrees with each other and projected from the pillar 12. The catching sections 16, 21 turn in a body together with the pillar 12.

In the state shown in FIG. 1, the upper stream side catching section 16 is opposite to the bead supply apparatus 30, and the down stream side catching section 21 is opposite to the bead-with-filler preset apparatus 40. If the catching sections 16, 21 turn clockwise by 90 degrees, the upper stream side catching section 16 is opposite to the bead-with-filler preset apparatus 40, and the down stream side catching section 21 is opposite to the bead-with-filler supply apparatus 50.

Figure 3:
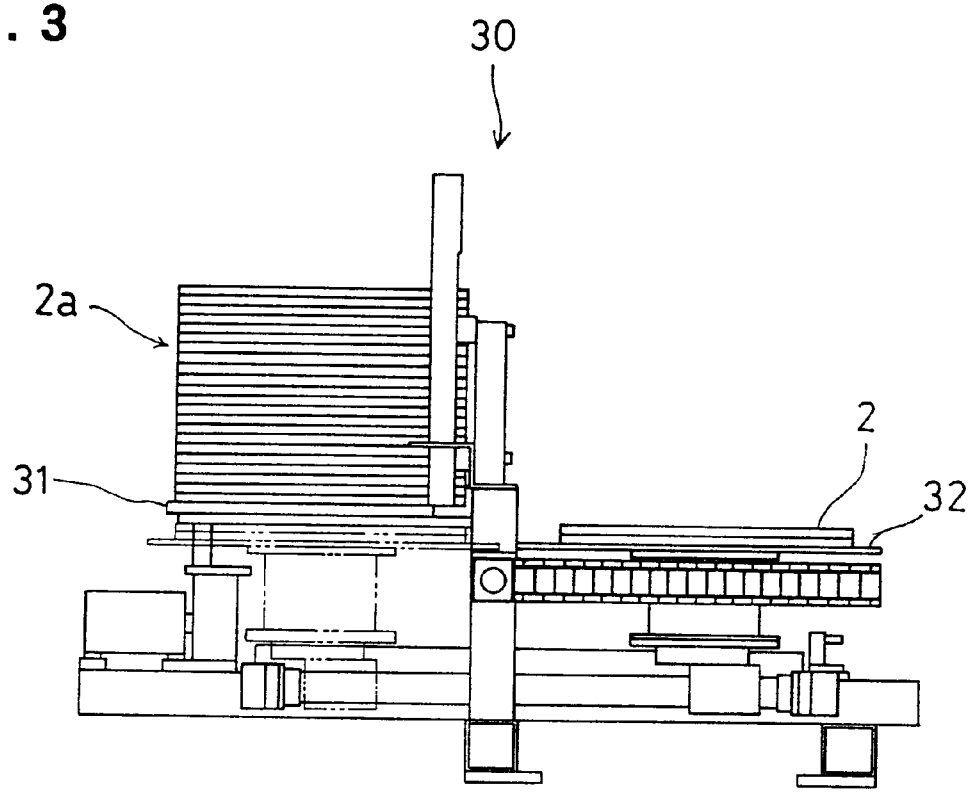
FIG. 3 is a front view of a bead supply apparatus.

In the bead supply apparatus 30 positioned on the upper stream side of the bead-with-filler preset apparatus 40, as shown in FIGS. 1 and 3, a cylindrical bead bundle 2a which is formed of many annular beads 2 vertically piled up, is held by a holding means 31 which pinches the bead bundle 2a from the outside.

The bead 2 is made of twisted wires covered by a rubber layer, therefore the beads 2 of the bead bundle 2a adhere to each other.

Along a lower face of the bead bundle 2a held by the holding means 31 moves a sliding plate 32 horizontally between a position below the bundle 2a and a front position. A part of the sliding plate 32 is composed of a separate rising plate 33 which rocks relatively to the sliding plate 32 so as to rise and fall and has a catching member 34.

The catching member 34 is composed of a support shaft 35 projected from the rising plate 33 and three expansible rods 36 extending from the support shaft 35 radially at regular intervals. The rods 36 rock together with the rising plate 33 between a rising vertical posture and a falling horizontal posture.

When the rising plate 33 falls down, it forms the same plane as the sliding plate 32 and the expanded three rods 36 can catch lower two beads 2 of the bundle 2a placed on the sliding plate 32 from the inner side.

Therefore, if the bead bundle 2a is placed on the sliding plate 32 with the catching member 34 positioned inside of the bead bundle 2a, the rods 36 of the catching member 34 are expanded to catch the lower first and second beads 2 while the portion of the bead bundle 2a above the second bead 2 is pinched by the holding member 31, and the sliding plate 32 is slid forward together with the catching member 34, the second bead 2 is separated from the third bead 2 so that the first and second beads 2 are taken out.

FIG. 1 shows a state that the two beads 2 have been taken out. When the rising plate 33 rocks from the falling horizontal posture shown in FIG. 1, the beads 2 caught by the rods 36 are positioned in the rising vertical posture facing with the transfer apparatus 10 as shown in FIG. 2 (dot-dash line) and FIG. 4.

The bead-with-filler preset apparatus 40 for attaching fillers to the beads 2 supplied by the bead supply apparatus 30 has a plurality of catching rollers 41 arranged opposite to the transfer apparatus 10 for supporting the pair of beads 2 adhering to each other from the inside rotatably, a filler supply means 42 for supplying fillers to the beads 2 supported by the catching rollers 41, and a filler fixing means 43 for fixing the supplied fillers to the rotating pair of beads 2 simultaneously.

The bead-with-filler supply apparatus 50 disposed at further down stream side of the bead-with-filler preset apparatus 40 has a holding drum 51 provided at a position opposite to the transfer apparatus 10 so as to appear and disappear. At both ends of the holding drum 51 are formed holding sections 52, 53 having six retaining pawls 52a, 53a, respectively.

The retaining pawls 52a, 53a can radially expand and contract simultaneously and catch a piece of bead-with-filler 3 from the inside when it expands.

A temporary holding plate 55 is provided opposite to the transfer apparatus 10 supported by an expansible support rod 56 extending from the side of the transfer apparatus 10.

The temporary holding plate 55 is an electromagnet capable of attracting the bead-with-filler 3 to hold it and moves toward or away from the transfer apparatus 10 in accordance with contraction or expansion of the support rod 56. When the temporary holding plate 55 is away from the transfer apparatus 10, the holding drum 51 can enter between the temporary holding plate 55 and the transfer apparatus 10 as shown in FIG. 1. At that time, one holding section 52 is opposite to the transfer apparatus 10 and another holding section 53 is opposite to the temporary holding plate 55.

FIGS. 7-1 to 7-12 show operations of the bead-with-filler automatic supply structure 1 in accordance with lapse of time.

Figures 1, 7:
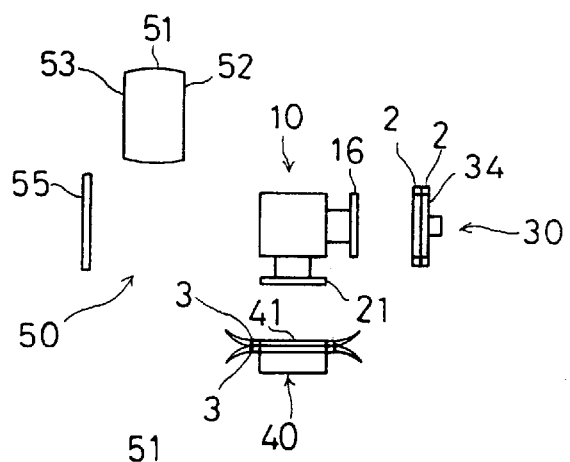
Figures 2, 7:
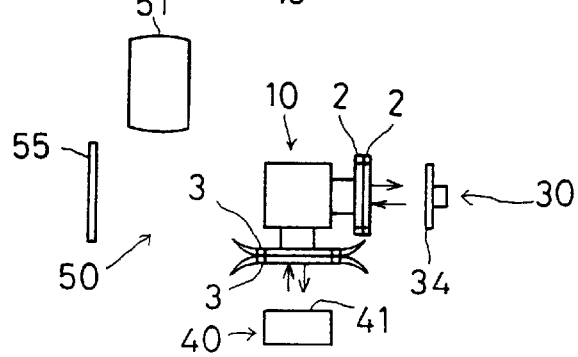
Figures 3, 7:
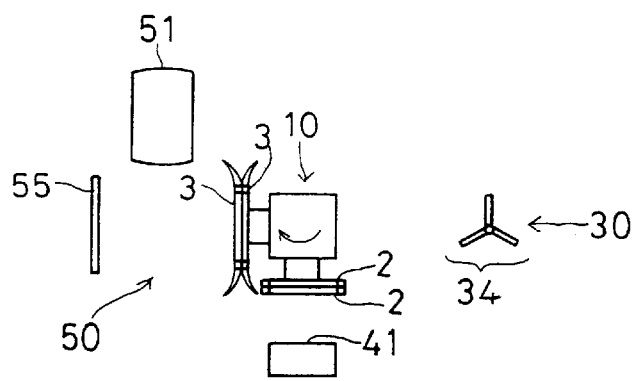
Figures 4, 7:
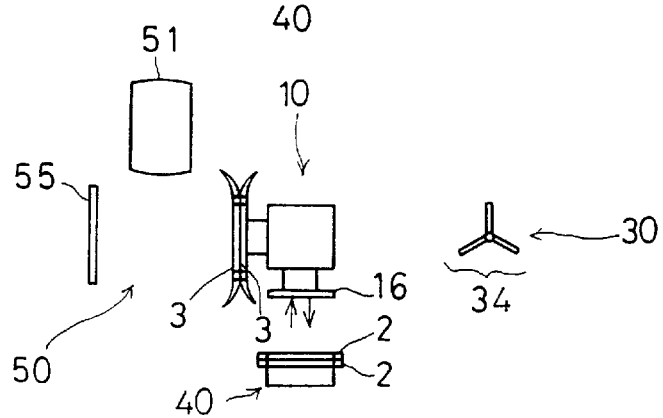
Figures 5, 7:
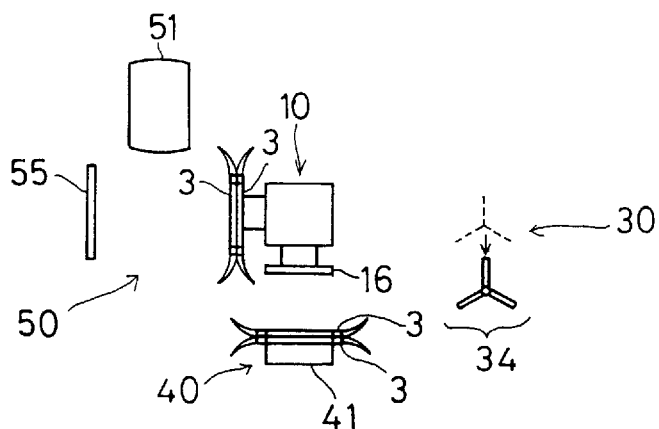
Figures 6, 7:
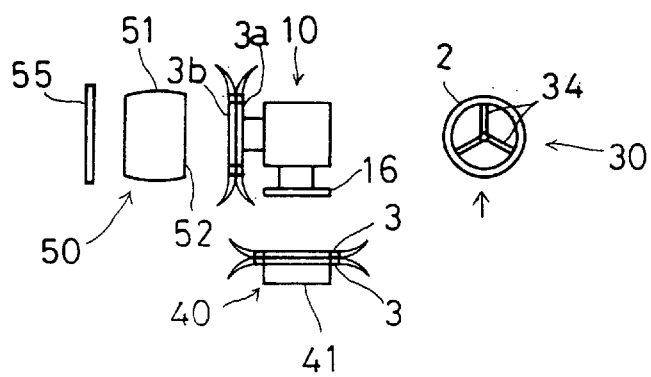
Figure 7:
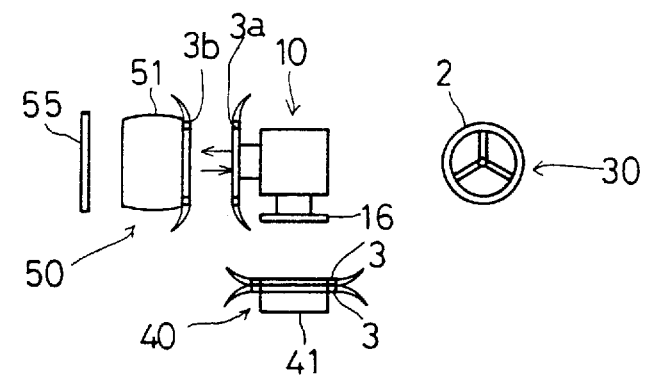

In the state shown in FIG. 7-1, the upper stream side catching section 16 and the sown stream side catching section 21 of the transfer apparatus 10 are opposite to the bead supply apparatus 30 and the bead-with-filler preset apparatus 40, respectively. The catching member 34 of the bead supply apparatus 30 is in the rising posture holding a pair of beads 2 adhering to each other, the catching rollers of the bead-with-filler preset apparatus 40 hold a pair of beads-with-filler 3 adhering to each other, and the holding drum 51 of the bead-with-filler supply apparatus 50 is moved to the molding machine side.

Figure 4:
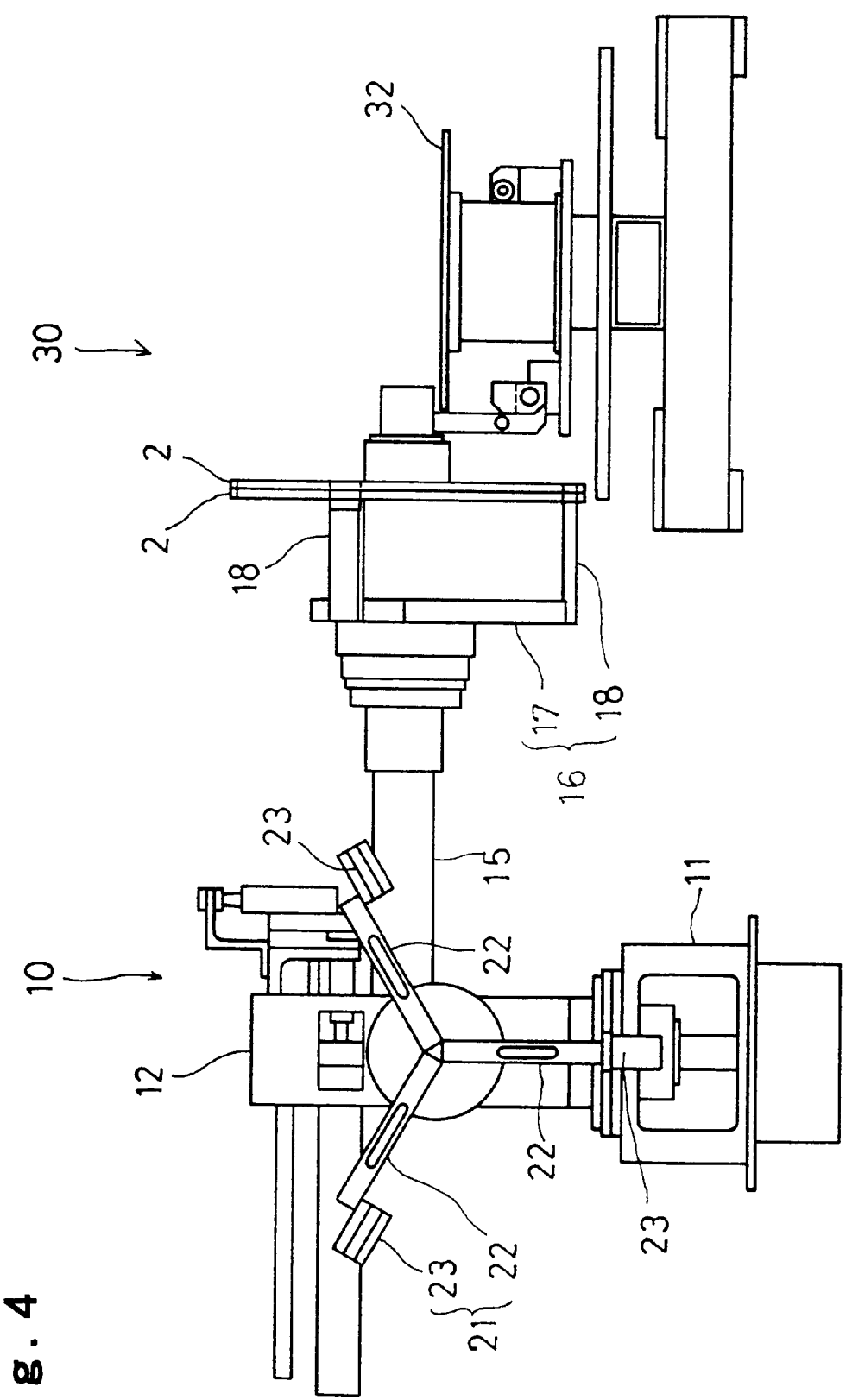
FIG. 4 is a side view showing a process of delivering beads from the bead supply apparatus to a transfer apparatus.

From the state of FIG. 7-1, as shown in FIG. 4, the arm 15 is expanded and the upper stream side catching section 16 advances to receive the beads 2 caught by the catching member 34 of the bead supply apparatus 30, then the arm 15 is contracted and the upper stream side catching section 16 returns.

Nearly at the same time, the arm 21 is also expanded and contracted so that the down stream side catching section 21 advances to the beads-with-filler 3 caught by the catching roller 41 of the bead-with-filler preset apparatus, receives them and returns (FIG. 7-2).

Next, the upper stream side catching section 16 holding the beads 2 and the down stream side catching section 21 holding the beads-with-filler 3 are turned clockwise by 90 degrees in a body (FIG. 7-3).

Then the upper stream side catching section 16 delivers the beads 2 to the catching rollers 41 of the bead-with-filler preset apparatus 40 (FIG. 7-4), while the catching member 34 of the bead supply apparatus 30 falls down.

Figure 5:
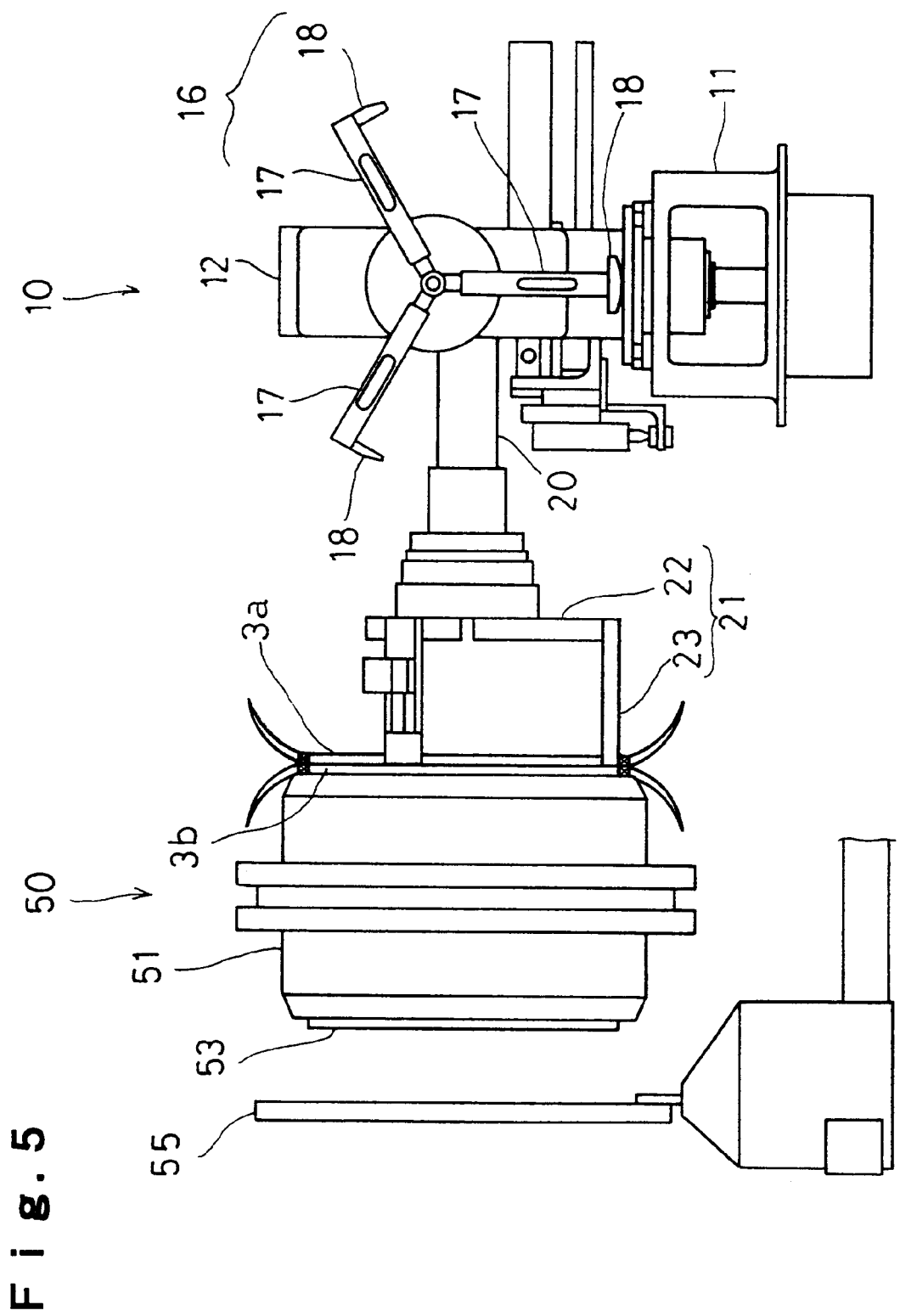
FIG. 5 is a side view showing a process of delivering the bead-with-filler from the transfer apparatus to a bead-with-filler supply apparatus.

At the bead-with-filler preset apparatus 40, the filler fixing means 42 attaches the fillers to the beads 2 which have been rotated into position (FIG. 7-5).

Figure 6:
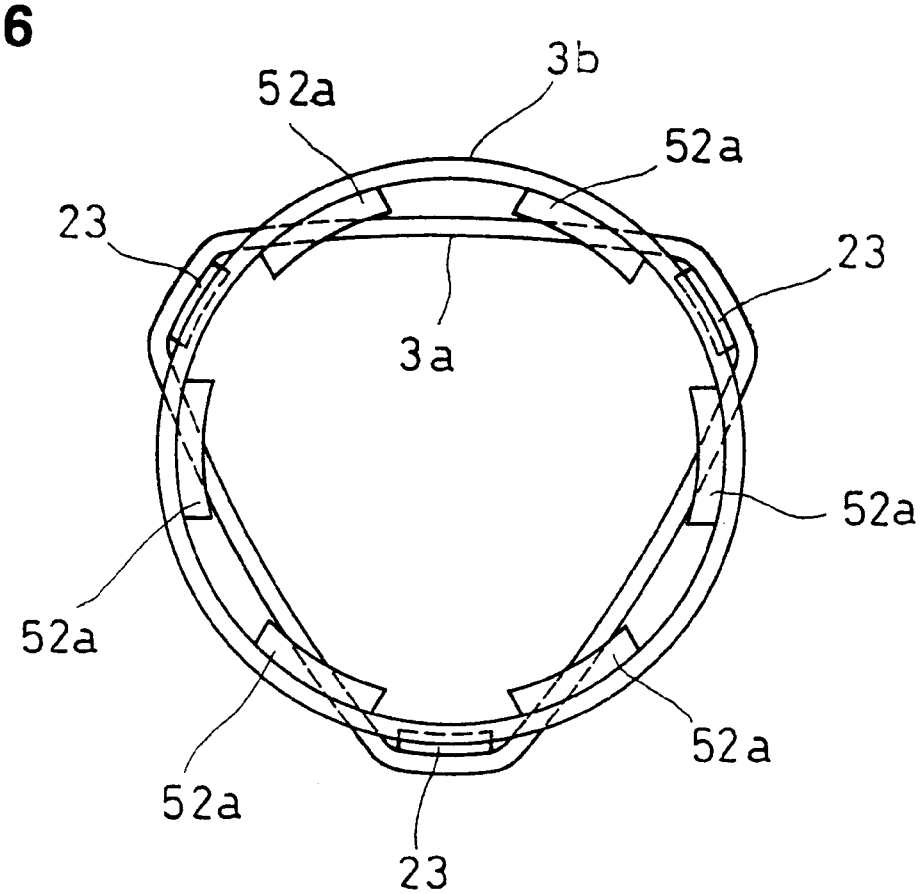
FIG. 6 is an illustration for explaining a method for separating a pair of beads-with-filler from each other.

In the meantime, the catching member 34 of the bead supply apparatus 30 moves under the bead bundle 2a to take out two beads 2 from the bundle 2a and the holding drum 51 of the bead-with-filler supply apparatus 50 enters between the transfer apparatus 10 and the temporary holding plate 55 (FIG. 7-6).

Next, as shown in FIG. 5, the down stream side catching section 21 holding the beads-with-filler 3 approaches the holding section 52 of the holding drum with the arm 20 expanded.

On the down stream side catching section 21 of the transfer apparatus 10, one bead-with-filler 3a is caught at three points by the retaining pieces 23 of the rods 22, and the six retaining pawls 52a of the holding section 52 of the holding drum 51 enter inside of another bead-with-filler 3b so that when the six retaining pawls 52a expand, the bead-with-filler 3b is supported from inside at six points.

When the three rods 22 supporting the bead-with-filler 3a at three points are expanded, as shown in FIG. 6, the bead-with-filler 3a is deformed into a triangle and separated from the bead-with-filler 3b supported by the retaining pawls 52a at six points to maintain a circular shape.

Then the catching section 21 of the transfer apparatus 10 is retreated, so that the bead-with-filler 3a is left on the down stream side catching section 21 and the bead-with-filler 3b is delivered to the holding section 52 of the holding drum 51 (FIG. 7-7).

The rods 22 of the down stream side catching section 21 is contracted to restore the bead-with-filler 3a into the original circular shape.

Figures 7, 8:
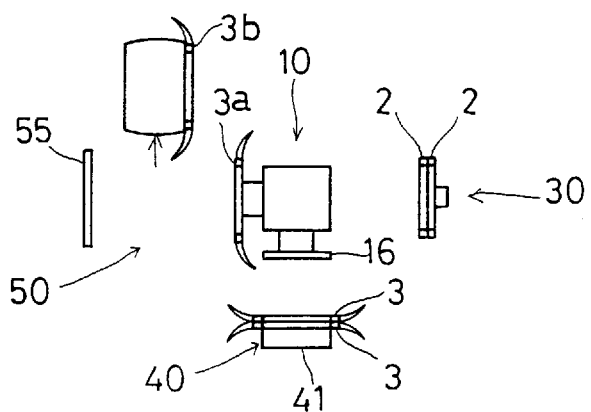

Next, the holding drum 51 holding the bead-with-filler 3b at the holding section 52 is retreated (FIG. 7-8). At that time, the catching member 34 of the bead supply apparatus 30 takes out the next pair of beads 2 and is in the rising posture.

Figures 7, 8, 9:
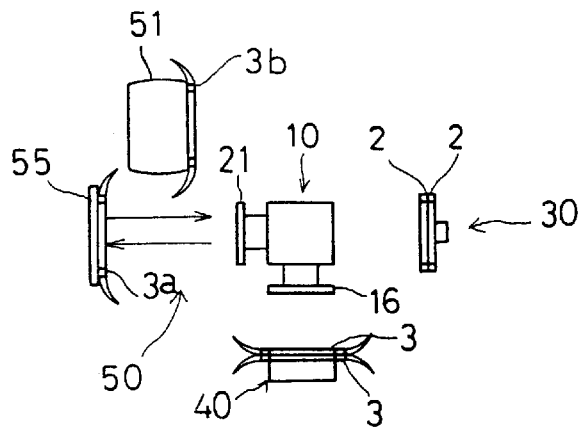
Figures 7, 8, 9, 10:
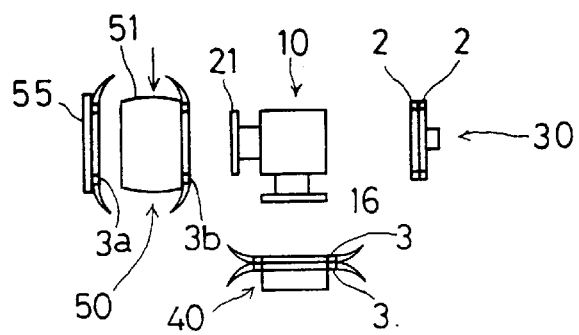
Figures 7, 8, 9, 10, 11:
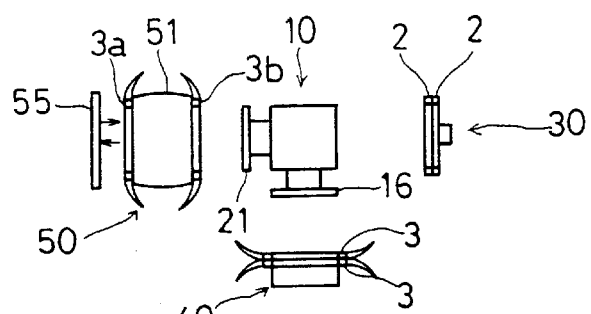
Figures 7, 8, 9, 10, 11, 12:
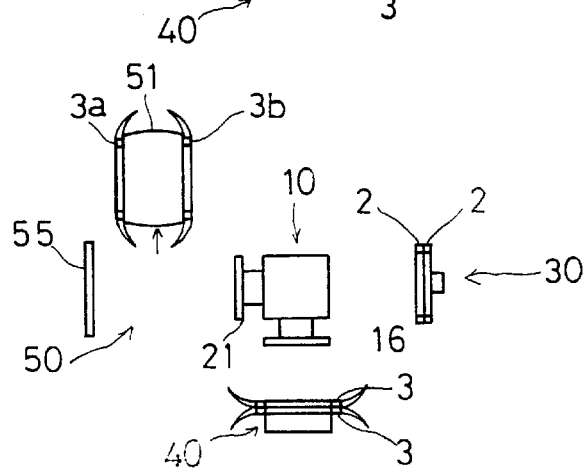

Then the support rod 56 is contracted to move the temporary holding plate 55 so as to touch the bead-with-filler 3a supported by the down stream side catching section 21 at three points. The temporary holding plate 55 is magnetized to attract the bead-with-filler 3a which is released from the down stream side catching section 21. Thus the bead-with-filler 3a is delivered to the temporary holding plate 55, then the temporary holding plate 55 with the bead-with-filler 3a attracted is returned to the original position (FIG. 7-9).

Next, the holding drum 51 is inserted between the transfer apparatus 10 and the temporary holding plate 55 (FIG. 7-10). Then the temporary holding plate 55 is moved to deliver the bead-with-filler 3a to the holding section 53 of the holding drum 51, and after that, the temporary plate 55 is returned to the original position (FIG. 7-11).

Thus, the beads-with-filler 3b, 3a are held at the holding sections on both ends of the holding drum 51, respectively, and the holding drum 51 is moved to the tire molding machine side to supply the pair of beads-with-filler 3a, 3b (FIG. 7-12).

Repeating the above-mentioned steps, the bead-with-filler automatic supply structure 1 presets beads-with-filler 3 from beads 2 and supply pairs of beads-with-filler 3a, 3b in a separated state to the tire molding machine in turn.

Thus, supply of beads-with-filler by hand which has obstructed automation of the tire molding equipment can be eliminated by automation.

Since transfer of the bead 2 from the bead supply apparatus 30 to the bead-with-filler preset apparatus 40 and transfer of the bead-with-filler 3 from the bead-with-filler preset apparatus 40 to the bead-with-filler supply apparatus 50 are carried out simultaneously by the upper stream side catching section 16 and the down stream side catching section 21 of the transfer apparatus 10 which turn in a body, improvement of working efficiency can be contrived.

In addition, a simple and compact mechanism can be obtained by using the common turning drive construction.

Since the upper stream side catching section 16 and the down stream side catching section 21 of the transfer apparatus 10 expand to catch the annular bead 2 and the annular bead-with-filler 3 from the inner side, the bead and the bead-with-filler can be caught simply and surely as well as miniaturization of the transfer apparatus 10 can be contrived.

Since the bead supply apparatus 30 separates a pair of beads 2 from the bead bundle 2a to supply them to the bead-with-filler preset apparatus 40, the beads can be supplemented in a form of the bead bundle efficiently.

The bead-with-filler preset apparatus 40 attaches fillers simultaneously to respective beads 2 piled up, therefore the preset work can be carried out efficiently.

The beads-with-filler 3a, 3b are respectively held at the holding sections 52, 53 on both ends of the holding drum 51, by separating the beads-with-filler 3a, 3b piled up from each other, delivering one bead-with-filler 3b to one holding section 52 of the holding drum 51, holding another bead-with-filler 3a on the temporary holding plate 55, then delivering the bead-with-filler 3a to another holding section 53 of the holding drum 51 from the temporary holding plate 55, thus supply of the beads-with-filler to the tire molding machine side can be facilitated.

What is claimed is:

1. A structure for automatic supply of a bead-with-filler, comprising:
   a bead-with-filler preset apparatus for presetting a fillers to a pair of annular beads;
   a bead supply apparatus positioned at an upper stream side of said bead-with-filler preset apparatus for supplying a pair of annular beads to said bead-with-filler preset apparatus;
   a bead-with-filler supplying apparatus positioned at a down stream side of said bead-with-filler preset apparatus for supplying both of said beads-with-fillers to a tire molding machine; and
   a transfer apparatus for transferring said pair of beads and both of beads-with-fillers having a first catching section, said transfer apparatus turning for positioning said catching section at each delivery position of said bead supply apparatus, said bead-with-filler preset apparatus and said bead-with-filler supply apparatus.

2. A structure for automatic supply of a bead-with-filler as claimed in claim 1, wherein said transfer apparatus has a second catching section, one of said catching sections moving following movement of the other of said catching sections with a lag.

3. A structure for automatic supply of a bead-with-filler as claimed in claim 2, wherein said catching section of the transfer apparatus has at least three retaining pieces arranged on a common circle capable of expanding and contracting so that said retaining pieces can catch at inner sides of each of said annular beads when said circle expands.

4. A structure for automatic supply of a bead-with-filler as claimed in claim 2, wherein said bead supply apparatus comprises means that separates two beads from a bundle of said annular beads that are piled up to supply them to said bead-with-filler preset apparatus.

5. A structure for automatic supply of a bead-with-filler as claimed in claim 1, wherein said transfer apparatus has an upper stream side catching section and a down stream side catching section which are disposed at an angle and turns as a body about a common turning center, said upper stream side catching section turns between said bead supply apparatus and said bead-with-filler preset apparatus for transferring said pair of beads, and said down stream side catching said bead-with-filler preset apparatus and said bead-with-filler supply apparatus for transferring said beads-with-fillers.

6. A structure for automatic supply of a bead-with-filler as claimed in claim 5, wherein said catching section of the transfer apparatus has at least three retaining pieces arranged on a common circle capable of expanding and contracting so that said retaining pieces can catch at inner sides of each of said annular beads when said circle expands.

7. A structure for automatic supply of a bead-with-filler as claimed in claim 1, wherein said catching section of the transfer apparatus has at least three retaining pieces arranged on a common circle capable of expanding and contracting so that said retaining pieces can catch at inner sides of each of said annular beads when said circle expands.

8. A structure for automatic supply of a bead-with-filler as claimed in claim 5, wherein said bead supply apparatus comprises means that separates two beads from a bundle of said annular beads that are piled up to supply them to said bead-with-filler preset apparatus.

9. A structure for automatic supply of a bead-with-filler as claimed in claim 1, wherein said bead supply apparatus comprises means that separates two beads from a bundle of said annular beads that are piled up to supply them to said bead-with-filler preset apparatus.

10. A method for automatic supply of bead-with-filler, comprising steps of:
    receiving a pair of beads supplied from a bead supply apparatus by catching section of a transfer apparatus;
    turning said catching section for delivering said pair of beads to a bead-with-filler preset apparatus;
    attaching a filler to each of said beads in said bead-with-filler preset apparatus for presetting a bead-with-filler;
    receiving said pair of beads-with-fillers by said catching section of said transfer apparatus;
    turning said catching section for delivering said pair of beads-with-fillers to a bead-with-filler supply apparatus; and
    supplying each of said bead-with-filler to a tire molding machine by said bead-with-filler supply apparatus.

11. A method for automatic supply of a bead-with-filler as claimed in claim 10, wherein said transfer apparatus has an upper stream side catching section and a down stream side catching section which are disposed at an angle and turns as a body about a common turning center, and when said upper stream side catching section turns to transfer said pair of beads from said bead supply apparatus to said bead-with-filler preset apparatus, said down stream side catching section turns to transfer said pair of beads-with-fillers from said bead-with-filler preset apparatus to said bead-with-filler supply apparatus.

12. A method for automatic supply of a bead-with-filler as claimed in claim 11, wherein said bead supply apparatus separates two pieces of beads from a bundle of said annular beads that are piled up to supply them as a pair, and said bead-with-filler preset apparatus attaches fillers to said two pieces of beads piles up simultaneously.

13. A method for automatic supply of a bead-with-filler as claimed in claim 6, wherein said bead supply apparatus separates two pieces of beads from a bundle of said annular beads that are piled up to supply them as a pair, and said bead-with-filler preset apparatus attaches fillers to said two pieces of beads piles up simultaneously.

14. A method for automatic supply of a bead-with-filler as claimed in claim 13, wherein said bead-with-filler supply apparatus has holding sections at both ends and a temporary holding section separated from said holding sections, and said pair of beads piled upon on said transfer apparatus is delivered to said bead-with-filler supply apparatus by steps of:

- holding one bead with filler on one of said holding sections of said bead-with-filler supply apparatus while the other bead-with-filler is caught by said catching section of said transfer apparatus;
- separating said one bead-with-filler from said the other bead-with-filler and delivering said one bead-with-filler onto said one holding section of said bead-with-filler supply apparatus;
- moving said other bead-with-filler remaining on said catching section of said transfer apparatus onto said temporary holding section of said bead-with-filler supply apparatus; and
- delivering said other bead-with-filler held on said temporary holding section onto another holding section of said bead-with-filler supply apparatus.

* * * * *